United States Patent
Umeda et al.

(10) Patent No.: US 7,902,786 B2
(45) Date of Patent: Mar. 8, 2011

(54) MOTOR CONTROLLER

(75) Inventors: Nobuhiro Umeda, Fukuoka (JP);
Tetsuro Izumi, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 99 days.

(21) Appl. No.: 12/472,284

(22) Filed: May 26, 2009

(65) Prior Publication Data
US 2009/0230912 A1    Sep. 17, 2009

Related U.S. Application Data

(63) Continuation of application No. PCT/JP2007/070799, filed on Oct. 25, 2007.

(30) Foreign Application Priority Data

Nov. 28, 2006  (JP) ................. 2006-319729

(51) Int. Cl.
*G05B 5/01* (2006.01)
(52) U.S. Cl. .................. 318/619; 318/621; 318/632
(58) Field of Classification Search .......... 318/264–266, 318/286, 466–468, 619, 621, 632
See application file for complete search history.

(56) References Cited

U.S. PATENT DOCUMENTS

| | | | |
|---|---|---|---|
| 4,269,073 A * | 5/1981 | McIntyre | 74/5.7 |
| 6,219,196 B1 | 4/2001 | Semba et al. | |
| 6,259,221 B1 * | 7/2001 | Yutkowitz | 318/561 |
| 6,393,373 B1 * | 5/2002 | Duyar et al. | 702/115 |

FOREIGN PATENT DOCUMENTS

| JP | 3111046 B2 | 4/1999 |
|---|---|---|
| JP | 2002-202801 | 7/2002 |
| JP | 2005-020949 | 1/2005 |
| JP | 2005-063362 | 3/2005 |
| JP | 2005-275588 | 10/2005 |
| JP | 2006-221404 | 8/2006 |
| JP | 2006-227793 | 8/2006 |

* cited by examiner

*Primary Examiner* — Bentsu Ro
(74) *Attorney, Agent, or Firm* — Ditthavong Mori & Steiner, P.C.

(57) ABSTRACT

A motor controller includes a command part that generates a command signal, a control part that drives a control object through an output filter when the command signal is input, an operating amount detector that detects an operating amount of the control object, a frequency response characteristic measurement part that generates an open loop frequency response characteristic on the basis of the command signal and the operating amount, a model calculation part that simulates a frequency characteristic of the output filter, and a display that displays the add result of an amplitude characteristic of the frequency characteristic of the frequency response characteristic measurement part and an amplitude characteristic of the frequency characteristic of the model calculation part.

5 Claims, 2 Drawing Sheets

MOTOR CONTROLLER

CROSS-REFERENCE TO RELATED APPLICATION

The present application is related to PCT patent application Ser. No. PCT/JP2007/070799 titled "Motor Controller And Method For Adjusting Output Filter And Device For Adjusting Output Filter", and to Japanese Patent application No. 2006-319729 filed at Japan Patent Office titled "Motor Controller And Method For Adjusting Output Filter And Device For Adjusting Output Filter", all of which are incorporated herein by reference.

BACKGROUND OF THE INVENTION

1. Field of the Invention

The present invention relates to a motor controller applied to a positioning device for a semiconductor manufacturing apparatus or a machine tool, or to an industrial robot.

2. Description of Related Art

In related art, for example, Japanese Unexamined Patent Application Publication No. 2005-20949, an open loop frequency response characteristic of a machine not containing a characteristic of a control part is measured, a resonant frequency and attenuation detected on the basis of the measurement result are estimated, and an output filter is adjusted on the basis of the estimated value.

Also, in Japanese Unexamined Patent Application Publication No. 2005-275588, a closed loop frequency characteristic is predicted on the basis of a measured open loop characteristic of a machine and a control part model of a control part to be used, and a control parameter is adjusted on the basis of the prediction result.

Further, in Japanese Unexamined Patent Application Publication No. 2006-221404, an open loop frequency characteristic of a machine containing an output filter is measured, and a control parameter is adjusted while the effect of the output filter is checked.

SUMMARY OF THE INVENTION

According to an aspect of the invention, a motor controller includes a command part that generates a command signal, a control part that drives a control object through an output filter when the command signal is input, an operating amount detector that detects an operating amount of the control object, a frequency response characteristic measurement part that generates an open loop frequency response characteristic on the basis of the command signal and the operating amount, a model calculation part that simulates a frequency characteristic of the output filter, and a display that displays the add result of an amplitude characteristic of the frequency response characteristic of the frequency response characteristic measurement part and an amplitude characteristic of the frequency characteristic of the model calculation part.

According to another aspect of the invention, a method for adjusting an output filter in a motor controller includes the steps of outputting a torque command containing a plurality of frequency components by a command part to a control part, operating a control object by the control part when the torque command is input, measuring a speed resuponse by an operating amount detector, calculating an open loop frequency response characteristic of a machine by a frequency characteristic measurement part on the basis of the torque command and the measured speed response, displaying the calculation result of the open loop frequency response characteristic by a display, adjusting the output filter in accordance with the open loop frequency response characteristic, creating a frequency response characteristic model of the output filter by a model calculation part in accordance with a parameter of the set output filter, synthesizing the open loop frequency response characteristic and the frequency response characteristic of the output filter, displaying an open loop frequency response waveform through the output filter by the display, and reflecting the parameter of the output filter to the control part if a desired effect (response) is obtained by the effect of the output filter, or repeating the procedure from the adjustment of the output filter again if the desired effect (response) is not obtained, thereby optimally adjusting the output filter.

BRIEF DESCRIPTION OF THE DRAWINGS

Exemplary embodiments of the present invention will be described in detail based on the following figures, wherein.

DETAILED DESCRIPTION OF THE PREFERRED EMBODIMENTS

Embodiments of the invention will be described with reference to the figures.

Figure 1:
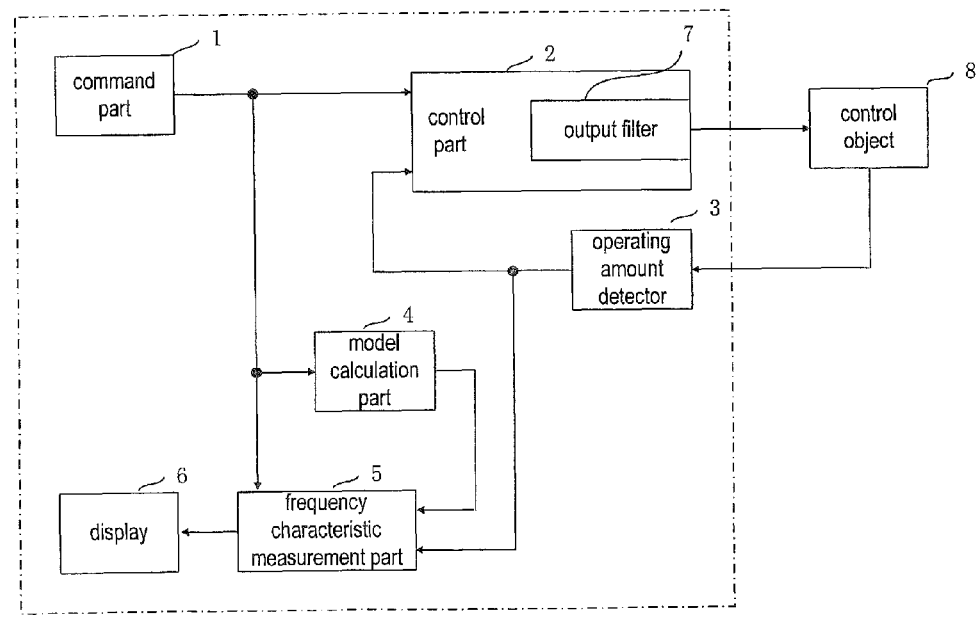
FIG. 1 is a block diagram showing a configuration of a motor controller according to an embodiment of the invention.

FIG. 1 is a block diagram showing a configuration of a motor controller according to an embodiment of the invention. The motor controller of this embodiment includes a command part 1, a control part 2, an operating amount detector 3, a model calculation part 4, a frequency characteristic measurement part 5, a display 6, an output filter 7, and a control object 8 including a motor and a machine.

The command part 1 generates a command signal by a higher-order system or by a manual operation. The control part 2 operates the control object 8 in response to the command signal.

The operating amount detector 3 detects an operating amount of the control object 8. The model calculation part 4 simulates a frequency characteristic of the output filter 7 in the control part 2.

The frequency characteristic measurement part 5 generates an open loop frequency response characteristic not containing a characteristic of the control part 2 on the basis of the operating amount detected by the operating amount detector 3 and the command signal of the command part 1.

The display 6 displays the sum of an amplitude characteristic of the frequency response measured by the frequency characteristic measurement part 5, and an amplitude characteristic of the frequency response of the output filter 7 generated by the model calculation part 4.

Here, the model calculation part 4, the frequency characteristic measurement part 5, and the display 6 may serve as an output filter adjustment device, and may be provided separately from the motor controller of the embodiment of the invention.

Figure 2:
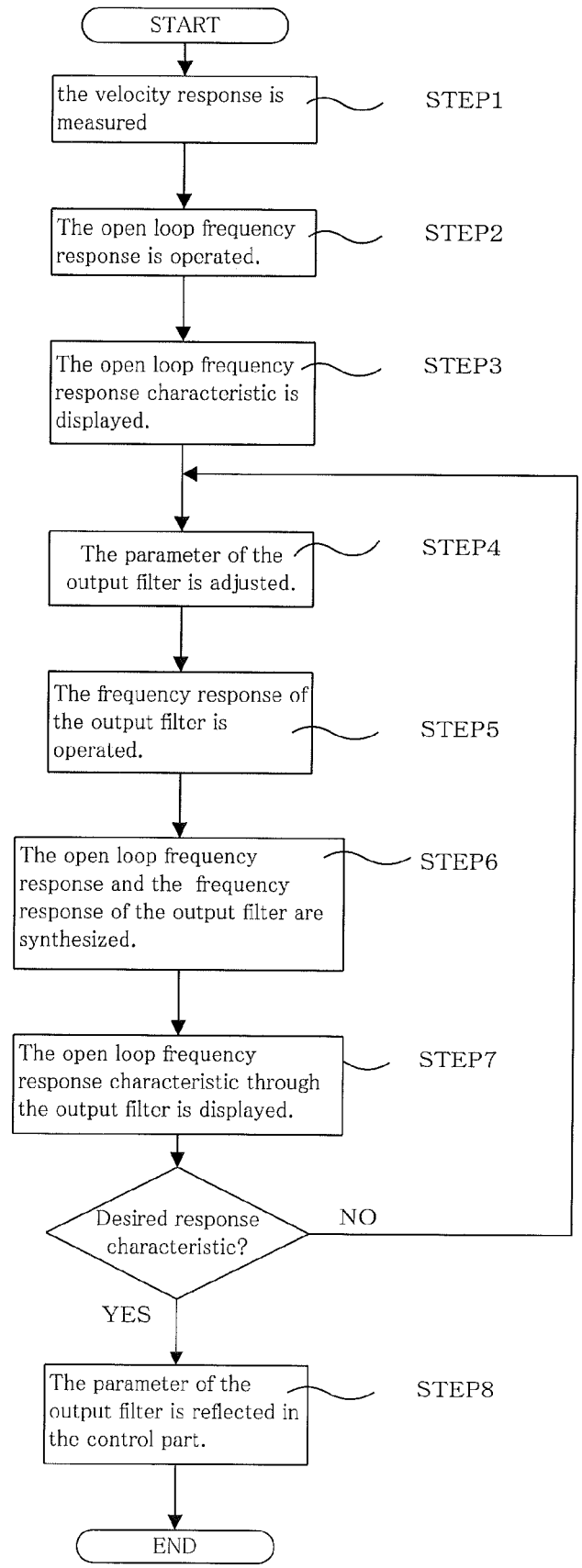
FIG. 2 is a flowchart showing a procedure of a method according to an embodiment of the invention.

FIG. 2 is a flowchart showing a procedure of a method according to an embodiment of the invention. Referring to FIG. 2, a method for adjusting the output filter in the motor controller according to the embodiment of the invention includes STEPS 1 to 8.

In STEP 1, the command part 1 outputs a torque command containing a plurality of frequency components to the control part 2. The control part 2 operates the control object 8 in response to the torque command. The operating amount detector 3 measures a speed response.

In STEP 2, the frequency characteristic measurement part 5 calculates an open loop frequency response characteristic of the machine on the basis of the torque command and the measured speed response.

In STEP 3, the display 6 displays the calculation result of the open loop frequency response characteristic. Herein, for example, an operator who operates the motor controller of the embodiment of the invention checks the displayed content.

In STEP 4, the output filter 7 is adjusted in accordance with the open loop frequency response characteristic. For example, when a characteristic resonance peak is present, a notch filter is set in accordance with the peak frequency. The notch filter corresponds to the output filter 7.

In STEP 5, a frequency response characteristic model of the output filter 7 is created in accordance with a parameter of the output filter set by the model calculation part 4.

In STEP 6, the open loop frequency response characteristic obtained in STEP 2 and the frequency response characteristic of the output filter are synthesized.

In STEP 7, the display 6 displays an open loop frequency response waveform obtained through the output filter 7. Herein, for example, the operator who operates the motor controller of the embodiment of the invention checks the displayed content, and also checks the effect of the output filter.

In STEP 8, if a desired effect (response) is obtained by the effect of the output filter 7, the parameter of the output filter 7 is reflected in the control part 2. In contrast, if the desired effect (response) is not obtained, the procedure from STEP 4 is repeated to adjust the output filter 7 optimally.

Now, STEPS 5 and 6 are described in more details.

Figure 3:
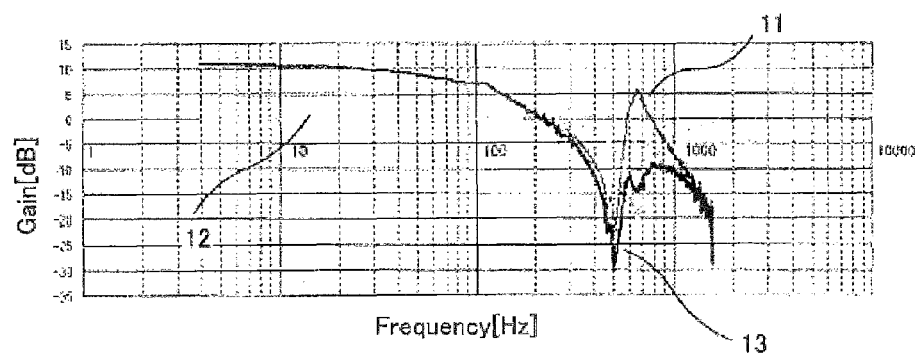
FIG. 3 is a diagram showing frequency response characteristics according to the embodiment.

FIG. 3 is a diagram showing frequency response characteristics according to the embodiment. Referring to FIG. 3, reference numeral 11 denotes an open loop frequency response characteristic, 12 denotes a frequency characteristic of the notch filter to be applied, and 13 denotes an open loop frequency response characteristic when the output filter is applied. It is found that a resonance peak owned by the machine is suppressed, and the frequency response characteristic of the open loop is improved by applying the proper notch filter.

The open loop frequency response characteristic 11 has a resonance peak which is assumed as a resonant frequency $\omega_H$. In this case, a notch filter having the frequency characteristic 12 is used as the output filter, so that a gain of the resonance peak is decreased.

A transfer function of the notch filter is defined by Equation (1) as follows:

$$G(s) \equiv \frac{s^2 + 2\frac{A}{Q}\omega_H s + \omega_H^2}{s^2 + 2\frac{1}{Q}\omega_H s + \omega_H^2} \quad (1)$$

where Q is a band width of the notch filter, and A is a parameter representing a depth. These values Q and A are adjusted in accordance with an anti-resonant frequency corresponding to the resonant frequency of the machine and attenuation.

When the transfer function G(s) is represented as an amplitude (gain) in a frequency domain, a function H($\omega$) of a frequency $\omega$ is defined by the following Equation (2).

$$H(\omega) = |G(j\omega)| \quad (2)$$

$$= 20\log\left(\frac{\sqrt{Q^2\omega^4 - 2Q^2\omega^2\omega_H^2 + A^2\omega_H^2\omega^2 + Q^2\omega_H^4}}{\sqrt{Q^2\omega^4 - 2Q^2\omega^2\omega_H^2 + \omega_H^2\omega^2 + Q^2\omega_H^4}}\right)$$

In this way, by inputting the parameters $\omega_H$, Q, and A of the notch filter, and a numerical value of a frequency scale, the amplitude in the frequency domain of the output filter can be obtained.

Also, when it is assumed that an open loop transfer function of the machine is Gm(s), and an amplitude in the frequency domain is Hm($\omega$), the amplitude in the frequency domain of the open loop through the notch filter is defined by the following Equation (3).

$$|G(j\omega) \times G_m(j\omega)| = H(\omega) + H_m(\omega) \quad (3)$$

That is, by simply adding the amplitude in the frequency domain of the notch filter to the amplitude in the frequency domain of the machine, the amplitude in the frequency domain of the open loop through the notch filter can be obtained. Accordingly, the effect of the notch filter can be easily checked.

The output filter is not limited to the notch filter of this embodiment. Characteristics of various filters to be applied as an output filter may be modeled, and amplitudes in the frequency domain may be added. Accordingly, the effect of the output filter can be checked. In the motor controller of the invention, for example, if a vibration frequency in a high frequency domain is present, the output filter may be defined by a primary delay filter model. Alternatively, characteristics of various filters, such as notch filters or primary delay filters, may be modeled in advance, and the output filter may be defined by the sum of a plurality of such filter models.

With the motor controller of this embodiment, a desired frequency response characteristic can be obtained with a single measurement operation and a simple calculation method. Accordingly, the motor controller can be applied to a positioning device for a semiconductor manufacturing device or a machine tool, or to an industrial robot. Also, the motor controller can be applied to a general industrial machine.

What is claimed is:

1. A motor controller comprising:
   a command part that generates a command signal;
   a control part that drives a control object through an output filter when the command signal is input;
   an operating amount detector that detects an operating amount of the control object;
   a frequency response characteristic measurement part that generates an open loop frequency response characteristic on the basis of the command signal and the operating amount;
   a model calculation part that simulates a frequency characteristic of the output filter; and
   a display that displays the add result of an amplitude characteristic of the open loop frequency response characteristic of the frequency response characteristic measurement part and an amplitude characteristic of the frequency characteristic of the model calculation part.

2. The motor controller according to claim 1, wherein the model calculation part provides a primary delay filter model as the output filter.

3. The motor controller according to claim 1, wherein the model calculation part provides a notch filter model as the output filter.

4. The motor controller according to claim 1, wherein the model calculation part provides the sum of a plurality of filter models as the output filter.

5. A motor controller comprising:
- means for generating a command signal;
- means for driving a control object through an output filter when the command signal is input;
- means for detecting an operating amount of the control object;
- means for generating an open loop frequency response characteristic on the basis of the command signal and the operating amount;
- means for simulating a frequency characteristic of the output filter; and
- means for displaying the add result of an amplitude characteristic of the open loop frequency response characteristic and an amplitude characteristic of the frequency characteristic.

* * * * *